US006244370B1

(12) United States Patent
Peter

(10) Patent No.: US 6,244,370 B1
(45) Date of Patent: Jun. 12, 2001

(54) ASYMMETRICAL DRIVE SYSTEM

(75) Inventor: Tim Peter, Medina, OH (US)

(73) Assignee: MTD Products Inc, Cleveland, OH (US)

( * ) Notice: Subject to any disclaimer, the term of this patent is extended or adjusted under 35 U.S.C. 154(b) by 0 days.

(21) Appl. No.: 09/243,356

(22) Filed: Feb. 1, 1999

Related U.S. Application Data

(62) Division of application No. 08/679,195, filed on Jul. 12, 1996, now Pat. No. 5,894,907.

(51) Int. Cl.[7] .................................................. B60K 17/00
(52) U.S. Cl. ........................ 180/374; 56/229; 74/606 R; 180/337; 180/344; 180/371
(58) Field of Search ..................................... 180/374, 337, 180/344, 371, 305, 306, 308; 74/606 R; 403/3, 4; 56/229

(56) References Cited

U.S. PATENT DOCUMENTS 3,854,546 * 12/1974 Andersson ............................ 180/371
4,962,821 * 10/1990 Kim ..................................... 74/606 R
5,408,896 * 4/1995 Vogt ....................................... 74/361

* cited by examiner

*Primary Examiner*—Eric Culbreth
(74) *Attorney, Agent, or Firm*—Emerson & Skeriotis; Roger D. Emerson; Timothy D. Bennett

(57) ABSTRACT

A drive system for a grounds care device using two identical final drives in combination with two identical power units to provide directional drive to the wheels.

The final drives and power units are assembled to each other differently for use on each side to provide the required relative reverse rotation of each drive wheel while maintaining the same direction of control movement for forward (or reverse) movement of each drive wheel (in regards to machine movement).

Additionally, the drive belt for the cutting unit is routed between the power units (rather than under or over) to allow a lower center of gravity for increased stability.

5 Claims, 4 Drawing Sheets

ASYMMETRICAL DRIVE SYSTEM

This application is a Division of Ser. No. 08/679,195, filed Jul. 12, 1996, now U.S. Pat. No. 5,894,907.

FIELD OF THE INVENTION

This invention relates to a drive system for wheeled vehicles more particularly, in the preferred embodiment, a commercial ride-on mid-mount deck lawnmower.

BACKGROUND OF THE INVENTION

Modern ground care equipment, whether they be walk behind or riding, typically have some sort of drive system extending from a source of power like a motor to the drivewheels—typically two in number on opposite lateral sides of a frame. The drive systems are functional in that they do transmit the power to the wheels, thus relieving the operator of the significant chore of physically manipulating the device around the lawn or grounds. The types of transmissions which accomplish this are normally single piece units having a single input drive shaft and a specially designed transmission casing interconnected to both axles—thus to provide the entire drive system in a single package. Other devices, typically in the more expensive commercial units, will have separate drive systems for each side of the device with these special drive systems specifically designed for the certain application. This typically necessitates having a systems specially designed for the right side of the device being distinct from that specially designed for the left side of the device. Alternately, some sort of complex direction or reversing mechanism has to be incorporated into either or both units or to the drive system which interconnects them both commonly to the engine. These special designs are expensive to design, manufacture, and repair. One reason for this is the effective dual inventory and/or high number of complex parts utilized in such systems.

OBJECTS AND SUMMARY OF THE INVENTION

It is an object of the present invention to reduce the cost of a drive system for grounds care equipment.

It is another object of the present invention to simplify the construction of drive systems.

It is yet another object of the present invention to reduce the physical size of drive systems.

It is still another object of the present invention to reduce the complexity of drive systems.

It is a further object of the present invention to lower the cost to build and to repair drive systems.

Other objects and a more complete understanding of the invention may be had by referring to the drawings.

BRIEF DESCRIPTION OF THE DRAWINGS

The structure, operation, and advantages of the presently disclosed preferred embodiment of the invention will become apparent upon consideration of the following description taken in conjunction with the accompanying drawings wherein.

DETAILED DESCRIPTION OF THE INVENTION

Figure 1:
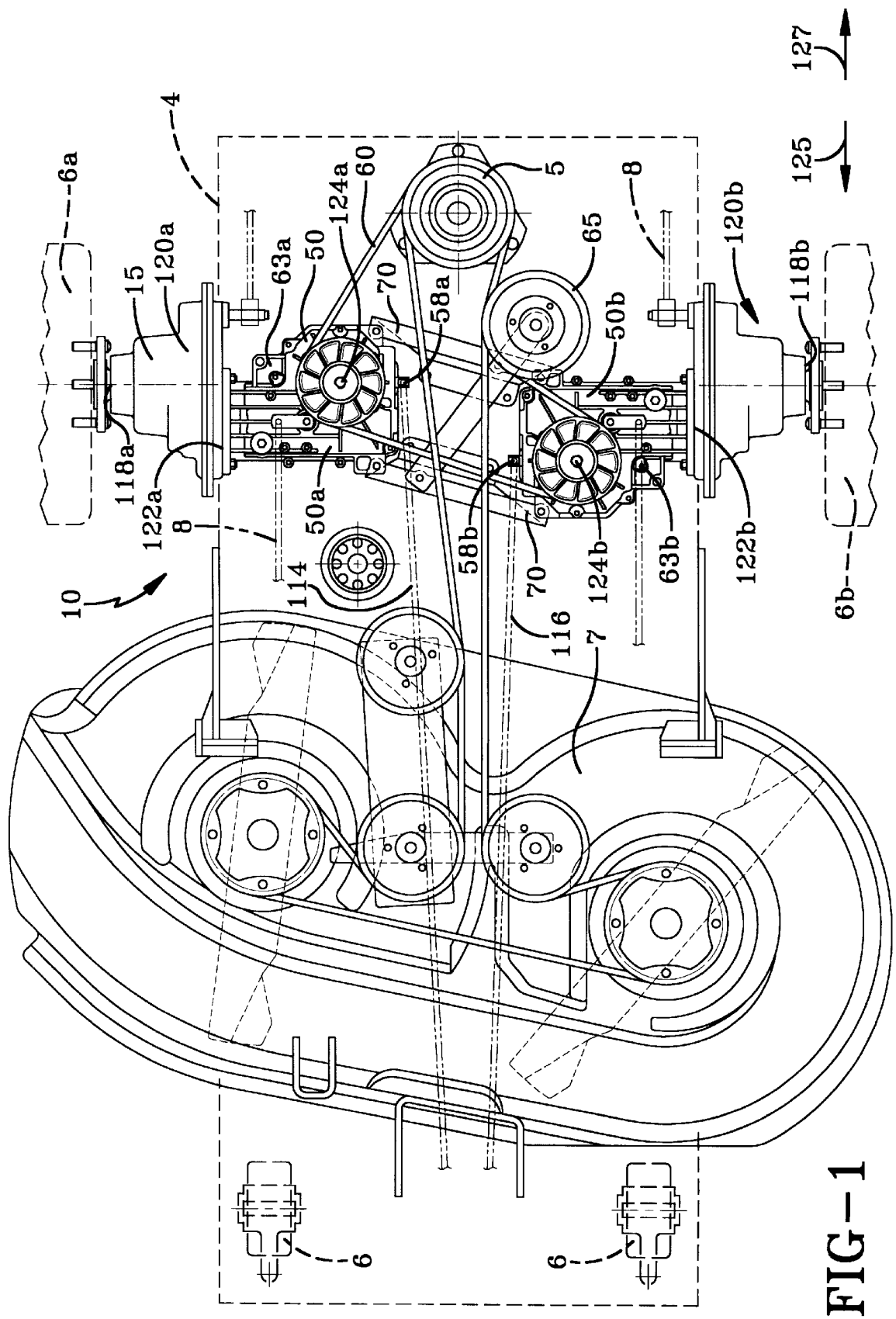
FIG. 1 is a drawing of the main power train for a riding mower incorporating the invention of the application.

The transmission of this invention is designed for use with a grounds care device having a frame for controlled travel over a lawn or other grounds. This device may be a riding mower, a walk behind mower, a tractor, a utility vehicle or other device utilized in grounds care. As the particular nature of the device is unnecessary for appreciation of the applicant's invention, these devices are found in representational form in FIG. 1. This includes in representation form a frame 4, an engine 5, wheels 6, a driven tool 7 (twin bladed mower with clutch shown), and controls 8 (speed/direction, brake, engine speed and mower shown). The front wheels of the grounds care device are pivotly mounted to the frame 4 so as to allow the device to spin about its rear axles—a zero turn mower.

Figure 2:
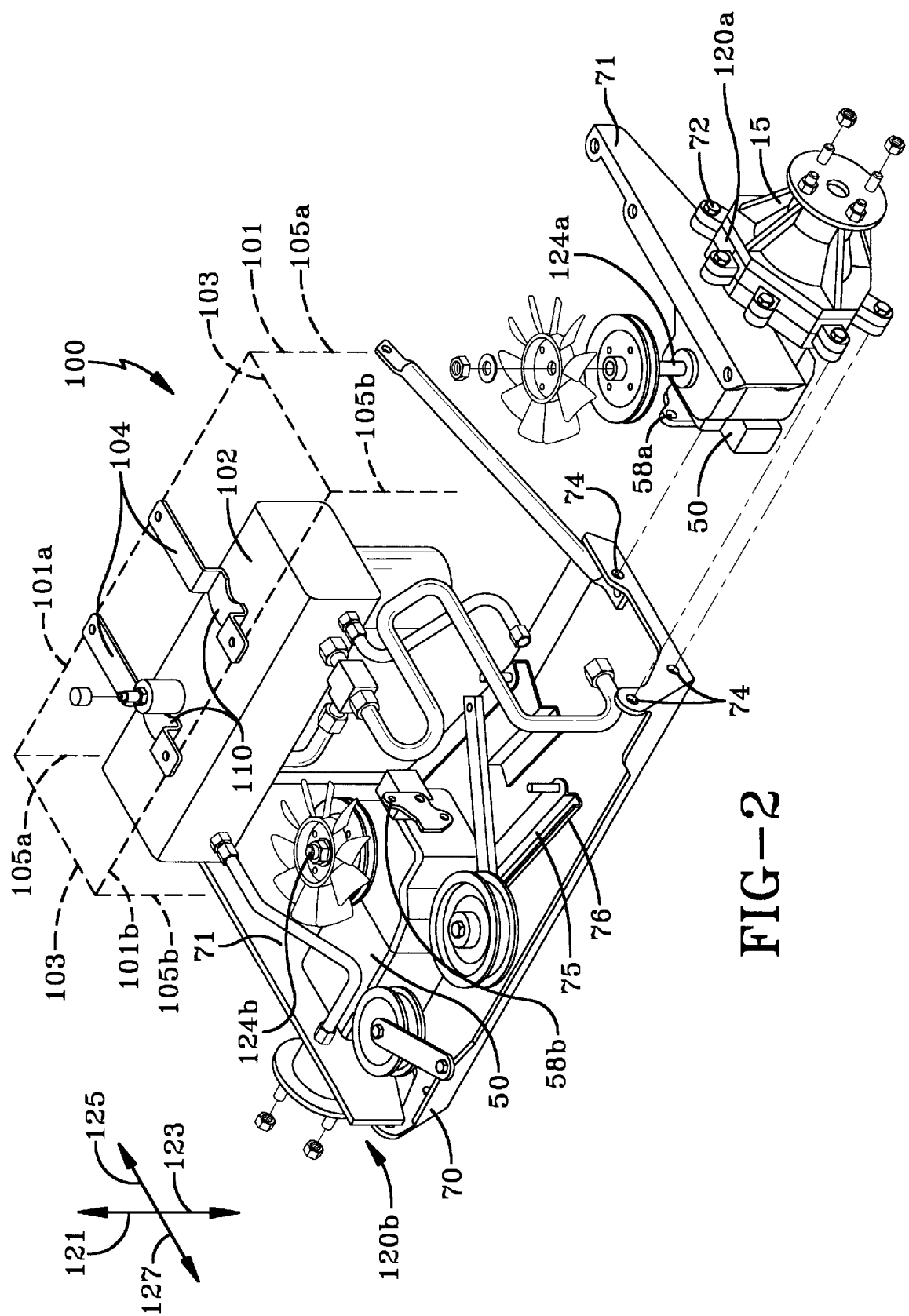
FIG. 2 is a partially disassembled perspective view of the drive system of FIG. 1.

Asymmetrical drive system 10 of this invention includes a final ratio 15 (planetary reduction drive shown), a power unit 50 (a hydrostatic transmission from Agrifab shown), a mounting bracket and skid 70, and a hydraulic tank 102 as shown in FIG. 2.

The final ratio 15 as shown combines the purposes of providing a speed reduction function in addition to mounting the wheel and power unit onto the frame.

Figure 3:
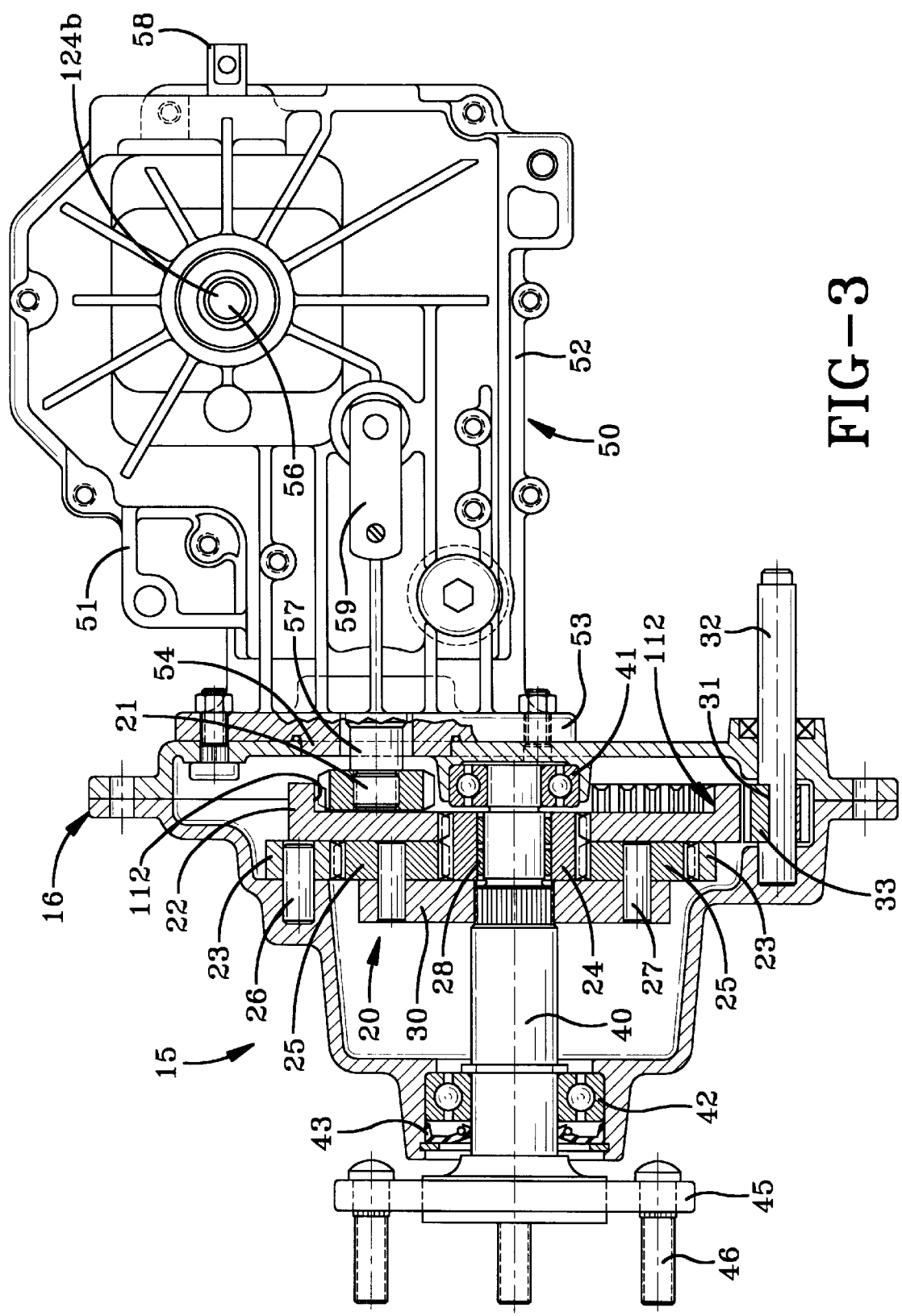
FIG. 3 is a partial cross-sectional view of the left side of the asymmetrical drive system of FIG. 1.

The preferred final ratio 15 is mounted in mirror image form as a pair of otherwise identical drives. The invention of the present application includes a way for compensating for the otherwise differing direction rotation of the wheels should this type of drive be connected to a motor rotating in a single direction. The planetary reduction drive 15 itself includes an outer case or housing 16, a planetary reduction gear system 20, and an output shaft 40 (FIG. 3).

The outer case 16 serves to mount the various other elements of the planetary reduction drive 15 together in relation to each other. In the preferred embodiment disclosed, the outer case in addition serves to rotatively mount the wheels 6 to the frame rails 4, provides a brake, and assists in mounting the later described power unit to the frame. The outer case in addition serves to contain the lubricant for the reduction drive.

The planetary reduction system 20 reduces the speed of the later described power unit to that which is more suitable for driving a device across the grounds. The planetary reduction gear system itself includes a spur gear input shaft 21, an internal gear 22, a sun gear 24, a multiplicity of planetary spur gears 25, and an output carriage assembly 30.

The spur gear input shaft 21 takes the rotary power of the later described power unit and mechanically interconnects it to gear teeth 112 on the inside of the internal gear 22. In the preferred embodiment disclosed, this provides a substantially 3.643 to 1 speed reduction.

The internal gear 22 itself drives a sun gear 24 rotatively mounted to the output shaft 40 by needle bearings 28. The output carriage assembly 30 is axially aligned with the center of the output shaft 40 surrounding same. A series of four further planetary spur gears 25 are located between the sun gear 24 and a further internal gear 23 fixed to the outer case 16 by pins 26 so as to rotate the output carriage assembly 30 through pins 27. This interconnects the planetary gear reduction system 20 to the wheels for drivingly interengaging same through an additional 3.3 to 1 reduction ratio. Total reduction is 12.021 to 1 reduction ratio.

The output shaft 40 itself is mounted to the outer case 16 of the reduction system by an inner ball bearing 41 and an outer ball bearing 42. An oil seal 43 immediately adjacent to the outer ball bearing ensures that the lubricant inside the planetary gear reduction system 20 does not escape to the atmosphere. Due to the inclusion of angular loads, the outer ball bearing 42 is preferably larger than the inner ball bearing 41.

The wheel mounting disk 45 with integral lugs 46 on the outside of the planetary gear reduction system allows such system to be selectively interconnected to a wheel. Due to the fact that the planetary reduction drive 15 is itself fixedly interconnected to the frame of the grounds care device (by a bolt to the later described frame interconnect arm and mounting bracket) the bearings 42 and 41 in addition physically support the grounds care device on the wheels—this in addition to the wheel drive previously explained.

Figure 5:
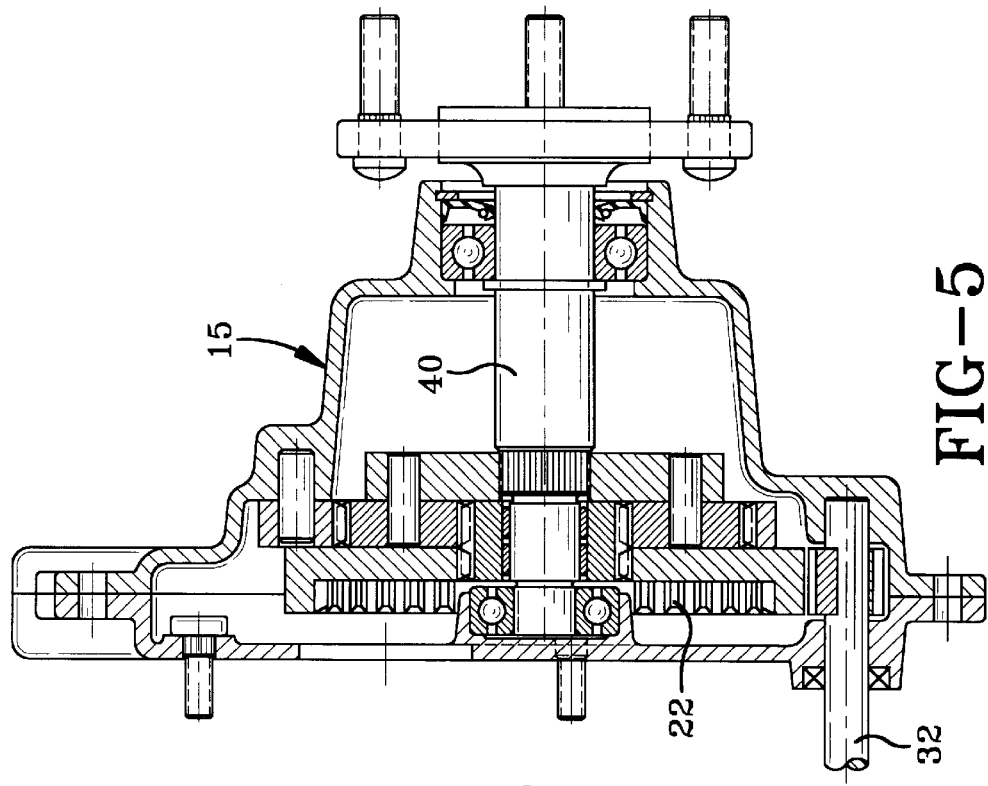
Figure 4:
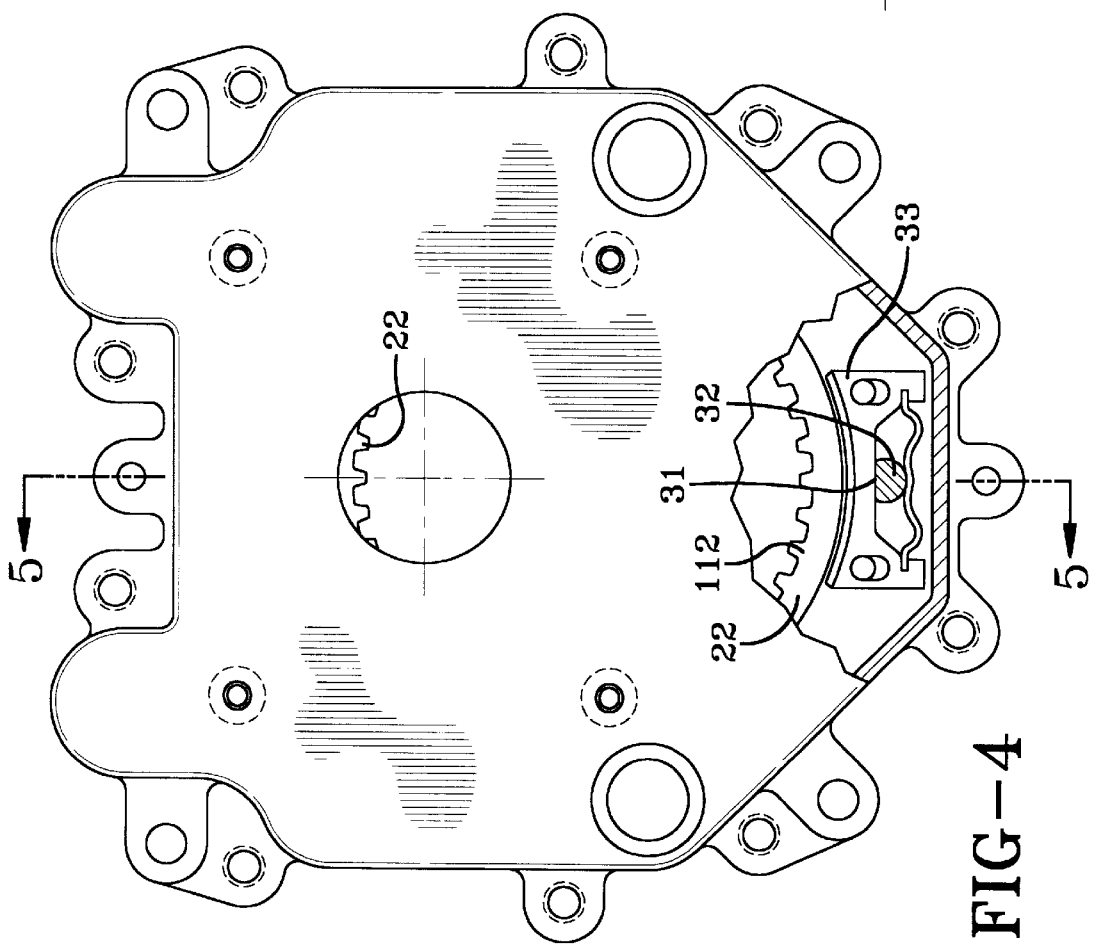
FIG. 4 is an end view of the final drive of the main drive system of the device of FIG. 1; and, FIG. 5 is a cross-sectional view of the final drive of FIG. 4 taken substantially along lines 5—5 therein.

A brake shaft 32 shown in FIGS. 3–5 enforces brake shoes 33 against the outside diameter of the internal gear 22 (through a cam 31) so as to provide for the selective braking of the wheel.

A power unit 50 is interconnected to the final ratio in order to provide the rotative power therefor.

In the particular preferred embodiment disclosed, this power unit 50 is a BDR drive hydrostatic power unit made by Agrifab and marketed under Model #BDR-301. This hydrostatic power unit 51 has a case 52. This case 52 serves to contain the movable parts of the hydraulic unit as well as serving to mount the hydrostatic unit onto the outer case 16 of the planetary reduction system 20 (by flange 53). The hydrostatic power unit 51 in addition includes a pump input shaft 56, a motor output shaft 57, and a direction and speed control 58. The direction and speed control 58 is accomplished for each power unit 50 using a later to be described control lever also referenced as 58.

The pump input shaft 56 is used to interconnect the hydrostatic unit to a motor. Due to the invention of the particular application, this is easily accomplished by a single drive belt 60 with a single spring loaded idler 65 (see FIG. 1). This pump input shaft 56 is typically rotated in a single direction. In the preferred embodiment disclosed, the pump of the hydrostatic unit has an output of 10 ccs per revolution.

The motor output shaft 57 provides the output power for the hydrostatic unit 51 (FIG. 3). In the preferred embodiment disclosed, this is accomplished by mounting the spur gear input shaft 21 of the planetary reduction system directly on the motor shaft. A boss with an O-ring 54 closely surrounding the motor shaft 57 seals the outer case 16 at this location in order to allow for the hydrostatic unit to be mounted on the planetary gear reduction system in a detachable manner without leaks.

Because the motor connected to the output shaft 57 has a capacity of some 21 ccs per revolution output of the output shaft, this hydrostatic unit in addition provides a substantially 2.1 to 1 reduction in speed input to output, thus further serving to increase the torque available for the final ratio 15.

The speed and direction of the motor output shaft 57 of the hydrostatic power unit is under control of a direction and speed control 58. At the substantially neutral position shown in FIGS. 2—3, the motor output shaft 57 is quiescent. If the speed and direction control 58 is moved angularly clockwise, the output shaft 57 will rotate in one direction, with RPMs increasing upon increasing angular deflection from the neutral position shown. Movement of the direction speed control 58 counterclockwise will cause the motor output shaft to rotate in the other direction, again with RPMs increasing upon increased angular movement of the control 58. Thus the rotation of the wheel mounting disk 45 is directly under the control of this hydrostatic direction and speed control 58.

A dump valve 59 is preferably located on the hydrostatic transmission so as to allow the wheels to free-wheel. This would allow movement of the grounds care device without operating the engine and/or damaging the components thereof.

The particular power unit 50 and final ratios 15 as shown in FIGS. 1 and 2 are asymmetric. This presents both complications and advantages. A tremendous advantage of this asymmetric orientation is that by reorienting the components in respect to each other, power units can be provided for both lateral sides of the grounds care device utilizing the same identical physical components. This substantially halves the inventory requirements for a manufacturer and/or repair dealer while also at the same time paradoxically simplifying the control systems for the device. An example of how this occurs is shown in FIGS. 1 and 2. As shown, by rotating the final drive 15 substantially 180° about a line perpendicular to the output shaft 40, a substantially mirror image of the final drive 15 is present between the opposite lateral sides of the grounds care device. At the same time this is occurring, the power unit 50, disconnected from the final drive 15, is rotated substantially 180° around the pump shaft 56 before being bolted onto the second asymmetric final drive. (note in FIG. 1 that a power unit bulge 63*a* of one power unit 15 points in a rearward direction 127 while a power unit bulge 63*b* of the other power unit 15 points in a forward direction 125). In other words, when assembled the final ratios 15 each have wheel connection ends 118*a*, 118*b* facing the respective wheels 6*a*, 6*b* and top sides 120*a*, 120*b* facing in an upward direction 121 and a downward direction 123 respectively, as shown in FIGS. 1–2. The power units 50 when assembled each have ratio connection ends 122*a*, 122*b* facing the respective final ratios 15 and the input shafts 56 each have first ends 124*a*, 124*b* that both face in the upward direction 121 as also shown in FIGS. 1–2. This power unit orientation causes the motors on opposite sides of the device to rotate in opposite directions (the motor on one side rotating clockwise for forward movement of the wheels while the other motor rotates counterclockwise for the same forward movement).

With this orientation the reversing of the direction of the power units 50 cancel each other out. By this it is meant that upon movement of the control lever 58 forward on either side of the device that particular wheel drive will power the unit in the same direction. Thus, one power unit 50 receives a clockwise rotation of its control lever 58 and is positioned toward wheel 6*a* thereby causing the wheel 6*a* to rotate to move the device in the forward direction 125 while the other power unit 50 receives a counter clockwise rotation of its control lever 58 and is positioned toward wheel 6*b* thereby causing the wheel 6*b* to rotate to also move the device in the forward Direction 125. Further, this is accomplished merely by making one of the control rods (control rod 114 being longer as shown) which interconnects the direction and speed control lever 58 to the associated controls approximately 3" longer at this particular location (control rod 114 being longer as shown)—substantially all other parts of any dual controls can be identical between the two sides. Further, the belt 60 interconnecting the respective power unit 50 to the motor can be short and simple (as shown in FIG. 1) with no concern over the need to compensate for the asymmetric units.

A mounting bracket 70 interconnects the power units and final ratio units together so as to (in combination with the later described frame interconnect arm) solidly interconnect the asymmetrical drive system to the grounds care device (FIG. 2).

The final ratios 15 are bolted separately to the frame interconnect arms 71 by bolts 72 so as to solidly interconnect such final ratio drives to such frame interconnect arms. The final ratios 15 are also separately bolted to the lateral ends of the mounting bracket 70, by bolts through bolt holes 74 shown in the preferred embodiment. This embodiment is preferred because, due to the displacement of at least one of the holes above the line interconnecting the other two, a strong substantially "L" shaped surface is formed for physically interconnecting the final ratio drives to their mounting bracket.

The power units 50, being fixedly interconnected to the final ratio drive 15, are reasonably supported thereby. However, to add additional strength, a pump support bracket 75 is bolted to the inner ends of the power units as well as to the central portion of the mounting bracket 70 (at the plane 76). This further integrates the power units 50 onto the mounting bracket as well as strengthening the final ratio 15 connection thereto.

Note that due to the reversal of mounting of the power units 50 between the lateral sides of the device, the pump support brackets 75 extend at an angle in respect to the mounting bracket 70. This creates a more solid support surface for the power units 50 at this particular location as well as strengthening the overall rigidity of the mounting bracket. This latter is important because the mounting bracket, one of the lowest elements in the drive system 10, also serves as a skid-bottoming against the ground in order to protect the drive components from any physical damage.

A hydraulic tank weldment 100 completes the construction of the drive system (for clarity shown in represental form in FIG. 2). While the specific purpose of this weldment is to localize the hydraulic tank and associated hydraulic components in respect to the power units, it also serves as a physical frame member for the device and more particularly in respect to the operator's seat and the body of the device in the preferred embodiment.

The particular preferred tank weldment 100 disclosed includes two lateral brackets 101, a hydraulic tank 102, control mounting flanges 103, and seat flanges 104.

The two brackets 101 are designed to solidly interconnect the tank weldment 100 to the body of the device. To accomplish this in the preferred embodiment, the two brackets are substantially "C" shaped with downwardly extending flanges 105 for solidly bolting the brackets to the siderails of the frame. To help visualize the "C" shapes, one bracket is referenced 101a having two downwardly extending flanges 105a and the other bracket is referenced 101b having two downwardly extending flanges 105b.

The tank 102 contains the main hydraulic fluid reservoir for the drive system 10. A single tank 102 is used for both power units 50 in the preferred embodiment. The tank itself is welded to the underside of two straps extending longitudinally between the two brackets 101 to fixedly interconnect the tank 102 thereto.

The control mounting flanges 103 provide for a efficient method of mounting engines and machine controls to the frame of the grounds care device. As the particular preferred drive system is used in a ride-on zero turn lawnmower having slightly rounded sides and hinged rear body, the control mounting flanges 103 allow these controls to remain intact on the frame while the hinged rear body is raised.

The seat flanges 104 extend upwardly off of the brackets 101 for providing a convenient location for the operator seat.

Although the invention has been described in its preferred embodiment with a certain degree of particularity, it is to be understood that numerous changes can be made without deviating from the invention as hereinafter claimed. For example, although the power units disclosed are hydrostatic power units, mechanical units could be substituted without departing with the invention or without multiple speeds. Further differing final drive units could be utilized such as spur gear units, with or without multi-speed ranges. The shift on the fly drive system of U.S. Pat. No. 5,408,896 Power Transmission Drive System, with a multi-speed final ratio would be particularly suitable.

What is claimed is:

1. A method of assembling an asymmetrical drive system to a vehicle, the method comprising the steps of:

providing the vehicle with a frame having first and second lateral sides, an engine for use in driving the vehicle and, a plurality of wheels including first and second wheels operatively connected to said first and second lateral sides of said frame respectively;

providing the asymmetrical drive system with first and second final ratios that are identical in design having first and second wheel connection ends and first and second top sides respectively and, first and second power units that are identical in design having first and second ratio connection ends and first and second input shafts each having first ends respectively;

positioning said first final ratio into operative relationship with said first wheel such that said first wheel connection end faces said first wheel and said first top side faces in an upward direction;

positioning said second final ratio into operative relationship with said second wheel such that said second wheel connection end faces said second wheel and said second top side faces in a downward direction;

positioning said first power unit into operative relationship with said first final ratio such that said first ratio connection end faces said first final ratio and said first end of said first input shaft faces in said upward direction; and, positioning said second power unit into operative relationship with said second final ratio such that said second ratio connection end faces said second final ratio and said first end of said second input shaft faces in said upward direction.

2. The method of claim 1 wherein, after the step of positioning said second power unit into operative relationship with said second final ratio such that said second ratio connection end faces said second final ratio and said first end of said second input shaft faces in said upward direction, the method comprises the step of:

operatively connecting said engine to said first and second input shafts of said first and second power units with a single drive belt.

3. The method of claim 2 further comprising the steps of:

providing said first and second power units with first and second control levers respectively;

wherein after the step of operatively connecting said engine to said first and second input shafts of said first and second power units with a single drive belt, the method comprises the steps of:

interconnecting a second control rod to said second control lever; and, interconnecting a first control rod that is about 3 inches longer than said second control rod to said first control lever.

4. A method of assembling an asymmetrical drive system to a mower, the method comprising the steps of:

providing the mower with a frame having first and second lateral sides, a mower deck for use in cutting associated vegetation, an engine for use in driving the vehicle and, a plurality of wheels including first and second wheels operatively connected to said first and second lateral sides of said frame respectively;

providing the asymmetrical drive system with first and second final ratios that are identical in design having first and second wheel connection ends and first and second top sides respectively and, first and second hydrostatic power units that are identical in design having first and second ratio connection ends and first and second input shafts each having first ends respectively;

positioning said first final ratio into operative relationship with said first wheel such that said first wheel connection end faces said first wheel and said first top side faces in an upward direction;

positioning said second final ratio into operative relationship with said second wheel such that said second wheel connection end faces said second wheel and said second top side faces in a downward direction;

positioning said first hydrostatic power unit into operative relationship with said first final ratio such that said first ratio connection end faces said first final ratio and said first end of said first input shaft faces in said upward direction;

positioning said second hydrostatic power unit into operative relationship with said second final ratio such that said second ratio connection end faces said second final ratio and said first end of said second input shaft faces in said upward direction; and, operatively connecting said engine to said first and second input shafts of said first and second hydrostatic power units with a single drive belt.

5. The method of claim 4 further comprising the steps of:

providing said first and second hydrostatic power units with first and second control levers respectively;

wherein after the step of operatively connecting said engine to said first and second input shafts of said first and second hydrostatic power units with a single drive belt, the method comprises the steps of:

interconnecting a second control rod to said second control lever; and, interconnecting a first control rod that is about 3 inches longer than said second control rod to said first control lever.

\* \* \* \* \*